(12) United States Patent
Hartmann-Thompson et al.

(10) Patent No.: US 12,103,994 B2
(45) Date of Patent: Oct. 1, 2024

(54) CATIONIC COPOLYMERS WITH PENDANT N-ALLYLIMIDAZOLIUM GROUPS

(71) Applicant: 3M INNOVATIVE PROPERTIES COMPANY, St. Paul, MN (US)

(72) Inventors: Claire Hartmann-Thompson, Lake Elmo, MN (US); Mark J. Pellerite, Woodbury, MN (US); Marina M. Kaplun, Woodbury, MN (US); John C. Thomas, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 401 days.

(21) Appl. No.: 17/593,703

(22) PCT Filed: May 18, 2020

(86) PCT No.: PCT/IB2020/054696
§ 371 (c)(1),
(2) Date: Sep. 23, 2021

(87) PCT Pub. No.: WO2020/250057
PCT Pub. Date: Dec. 17, 2020

(65) Prior Publication Data
US 2022/0169764 A1    Jun. 2, 2022

Related U.S. Application Data

(60) Provisional application No. 62/859,397, filed on Jun. 10, 2019.

(51) Int. Cl.
C08F 212/08 (2006.01)
B01J 41/14 (2006.01)
H01M 50/414 (2021.01)

(52) U.S. Cl.
CPC ............ *C08F 212/08* (2013.01); *B01J 41/14* (2013.01); *H01M 50/414* (2021.01)

(58) Field of Classification Search
CPC .................................................. C08F 212/08
See application file for complete search history.

(56) References Cited

U.S. PATENT DOCUMENTS

| | | |
|---|---|---|
| 3,935,086 A | 1/1976 | Misumi |
| 7,816,477 B2 | 10/2010 | Suwa |
| 9,481,939 B2 | 11/2016 | Masel |
| 9,580,824 B2 | 2/2017 | Masel |
| 9,849,450 B2 | 12/2017 | Masel |
| 9,945,040 B2 | 4/2018 | Masel |
| 2016/0107154 A1 | 4/2016 | Masel |
| 2017/0189898 A1 | 7/2017 | Masel |

FOREIGN PATENT DOCUMENTS

| | | |
|---|---|---|
| CN | 103030826 | 4/2013 |
| DE | 2506085 | 8/1976 |
| WO | WO 2016-039999 | 3/2016 |
| WO | WO 2016-064440 | 4/2016 |
| WO | WO 2020-157597 | 8/2020 |
| WO | WO 2020-240352 | 12/2020 |

OTHER PUBLICATIONS

Appel, "Frontiers, Opportunities, and Challenges in Biochemical and Chemical Catalysis of CO2 Fixation", Chemical Reviews, Jun. 2013, vol. 113, vol. 8, pp. 6621-6658.
Bard, "Electrochemical Reactions of Carbon Dioxide", Encyclopedia of Electrochemistry, pp. 202-225 (2006).
Bartkowiak, "Sorption of precious metals from acid solutions by functionalized vinylbenzyl chloride-acrylonitryle-divinylbenzene copolymers bearing amino and guanidine ligands", Reactive and functional polymers, 2005, vol. 65, pp. 135-142.
Costentin, "Catalysis of the electrochemical reduction of carbon dioxide", Chemical Society Review, 2013, vol. 42, No. 6, pp. 2423-2436.
Dakin, "Imidazolium bromide derivatives of brominated poly(isobutylene-co-para-methylystrene): synthesis of peroxide-curable ionomeric elastomers", American chemsical society, 2014, vol. 53, pp. 17527-17536.
Deavin, "Anion-exchange membranes for alkaline polymer electrolyte fuel cells: comparison of pendent benzyltrimethylammonium- and benzylmethylimidazolium-head-groups", Energy and environmental science, 2012, vol. 5, pp. 8584-8597.
Dimeglio, "Selective Conversion of $CO_2$ to CO with High Efficiency Using an Inexpensive Bismuth-Based Electrocatalyst", Journal of the American Chemical Society, Jun. 2013, vol. 135, No. 24, pp. 8798-8801.
Gattrell, "A review of the aqueous electrochemical reduction of $CO_2$ to hydrocarbons at copper", Journal of Electroanalytical Chemistry, Aug. 2006, vol. 594, No. 1, pp. 1-19.
Hugar, "Imidazolium Cations with Exceptional Alkaline Stability: A Systematic Study of Structure-Stability Relationships", Journal of the American Chemical Society, Jun. 2015, vol. 137, No. 27, pp. 8730-8737.
Inglis, "Electrocatalytic pathways towards sustainable fuel production from water and $CO_2$", Coordination Chemistry Reviews, Nov. 2012, vol. 256, No. 21-22, pp. 2571-2600.
Kondratenko, "Status and perspectives of $CO_2$ conversion into fuels and chemicals by catalytic, photocatalytic and electrocatalytic processes", Energy & Environmental Science, 2013, vol. 6, pp. 3112-3135.
Kutz, "Sustainion Imidazolium-Functionalized Polymers for Carbon Dioxide Electrolysis", Energy Technology, Jun. 2017, vol. 5, No. 6, pp. 929-936.
Lau, "New Insights into the Role of Imidazolium-Based Promoters for the Electroreduction of $CO_2$ on a Silver Electrode", Journal of the American Chemistry Society, Jun. 2016, vol. 138, No. 25, pp. 7820-7823.

(Continued)

*Primary Examiner* — Wenwen Cai

(57) ABSTRACT

Cationic copolymers having pendant N-allylimidazolium-containing groups are provided. The cationic copolymers can be used, for example, to provide anion exchange membranes for use in electrochemical cells such as fuel cells, electrolyzers, batteries, and electrodialysis cells. The anion exchange membranes typically have good mechanical properties and ionic conductivity.

11 Claims, No Drawings

(56) References Cited

OTHER PUBLICATIONS

Li, "Novel anion exchange membranes based on polymerizable imidazolium salt for alkaline fuel cell applications", Journal of Materials Chemistry, 2011, vol. 21, pp. 11340-11346.

Lim, "A review on the electrochemical reduction of $CO_2$ in fuel cells, metal electrodes and molecular catalysts", Catalysis Today, Sep. 2014, vol. 233, pp. 169-180.

Long, "Hydroxide Degradation Pathways for Imidazolium Cations: A DFT Study", The Journal of Physical Chemistry C, Apr. 2014, vol. 118, No. 19, pp. 9880-9888.

Ma, "A short review of catalysis for $CO_2$ conversion", Catalysis Today, Nov. 2009, vol. 148, No. 3-4, pp. 221-231.

Matsubara, "Thermodynamic Aspects of Electrocatalytic $CO_2$ Reduction in Acetonitrile and with an Ionic Liquid as Solvent or Electrolyte", American Chemical Society (ACS) Catalysis, Nov. 2015, vol. 5, No. 11, pp. 6440-6452.

Medina-Ramos, "Efficient Conversion of $CO_2$ to CO Using Tin and Other Inexpensive and Easily Prepared Post-Transition Metal Catalysts", Journal of the American Chemical Society, Feb. 2015, vol. 137, No. 15, pp. 5021-5027.

Oh, "Ionic liquids enhance the electrochemical $CO_2$ reduction catalyzed by $MoO_2$", Chemical Communication, 2015, vol. 51, No. 71, pp. 13698-13701.

Pellerite, "Imidazolium-Functionalized Polymer Membranes for Fuel Cells and Electrolyzers", The Electrochemical Society (ECS)—Transactions, 2017, vol. 80, No. 8, pp. 945-956.

Qiao, "A review of catalysts for the electroreduction of carbon dioxide to produce low-carbon fuels", Chemical Society Reviews, Nov. 2014, vol. 43, No. 2, pp. 631-675.

Qiu, "Alkaline imidazolium- and Quaternary ammonium-functionalized anion exchange membranes for alkaline fuel cell applications", Journal of materials chemistry, 2012, vol. 22, pp. 1040-1045.

Rosen, "In Situ Spectroscopic Examination of a Low Overpotential Pathway for Carbon Dioxide Conversion to Carbon Monoxide", Journal of Physical Chemistry C, Jun. 2012, vol. 116, No. 29, pp. 15307-15312.

Rosen, "Ionic Liquid-Mediated Selective Conversion of $CO_2$ to CO at Low Overpotentials", Science, Nov. 2011, vol. 334, No. 6056, pp. 643-644.

Snyder, "$CO_2$ Conversion to Chemicals with Emphasis on using Renewable Energy/Resources to Drive the Conversion", Commercializing Biobased Products: Opportunities, Challenges, Benefits, and Risks, 215-257 (2016).

Sun, "Switching the Reaction Course of Electrochemical $CO_2$ Reduction with Ionic Liquids", Langmuir, May 2014, vol. 30, No. 21, pp. 6302-6308.

Tang, "Poly(ionic liquid)s as New Materials for $CO_2$ Absorption", Journal of Polymer Science: Part A: Polymer Chemistry, 2005, vol. 43, pp. 5477-5489.

Vayenas, "Electrochemical $CO_2$ Reduction on Metal Electrodes", Modern Aspects of Electrochemistry, No. 42, 89-189 (2008).

Yang, "Highly alkaline stable N1-alakyl substituted 2-methylimidazolium functionalized alakaline anion exchange membranes", Journal of materials chemistry A, 2015, vol. 3, pp. 8559-8565.

Ye, "Relative chemical stability of Imidazolium-based alkaline anion exchange polymerized ionic liquids", Macromolecules, 2011, vol. 44, pp. 8494-8503.

Zhou, "Highly selective electrocatalytic reduction of carbon dioxide to carbon monoxide on silver electrode with aqueous ionic liquids", Electrochemistry Communications, Sep. 2014, vol. 46, pp. 103-106.

International Search report for PCT International Application No. PCT/IB2020/054696 mailed on Jul. 10, 2020, 5 pages.

CATIONIC COPOLYMERS WITH PENDANT N-ALLYLIMIDAZOLIUM GROUPS

CROSS REFERENCE TO RELATED APPLICATIONS

This application is a national stage filing under 35 U.S.C. 371 of PCT/IB2020/054696, filed May 18, 2020, which claims the benefit of U.S. Provisional Patent Application No. 62/859,397, filed Jun. 10, 2019, the disclosure of which is incorporated by reference in its/their entirety herein.

GOVERNMENT RIGHTS

This invention was made with Government support under Cooperative Agreement DE-AR0000950 awarded by the U.S. Department of Energy. The U.S. Government may have certain rights in this invention.

BACKGROUND

Anion exchange membranes are useful in various electrochemical cells such as, for example, fuel cells, electrolyzers, batteries, and electrodialysis cells. Previous anion exchange membranes have been prepared from various copolymers having cationic, nitrogen-containing groups. These copolymers have been prepared, for example, by reacting styrene/vinylbenzyl chloride copolymers with a nitrogen-containing base to provide the cationic, nitrogen-containing groups. Most of the membranes formed from these copolymers have inadequate mechanical strength. The membranes often are brittle and have low tensile strength.

SUMMARY

Cationic copolymers having pendant N-allylimidazolium-containing groups are provided. The cationic copolymers can be used, for example, to provide anion exchange membranes for use in electrochemical cells such as fuel cells, electrolyzers, batteries, and electrodialysis cells. The anion exchange membranes typically have desirable mechanical properties and ionic conductivity.

In a first aspect, a cationic copolymer is provided. The cationic copolymer contains a) a first monomeric unit of Formula (I)

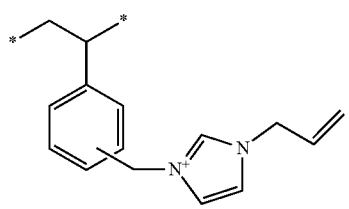

(I)

having a pendant N-allylimidazolium group in an ortho, para, or meta position of the benzene ring and b) a second monomeric unit of Formula (II-1), Formula (II-2) or a mixture thereof.

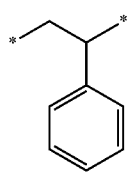

(II-1)

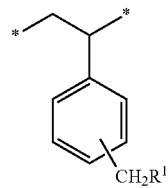

(II-2)

In Formula (II-2), $R^1$ is halo, hydroxy, or alkoxy and the pendant group —$CH_2R^1$ is in an ortho, para, or meta position of the benzene ring. Any cationic group in the cationic copolymer has a corresponding anionic group and each asterisk (*) indicates a point of attachment to another group or monomeric unit in the cationic copolymer.

In a second aspect, an anion exchange membrane is provided. The anion exchange membrane contains the cationic copolymer described in the first aspect above.

In a third aspect, an electrochemical cell is provided. The electrochemical cell includes an anion exchange membrane that contains the cationic copolymer described in the first aspect above.

In a fourth aspect, a method of making a cationic copolymer having pendant N-allylimidazolium-containing groups is provided. The method includes providing a precursor copolymer comprising monomeric units derived from styrene and monomeric units derived from vinylbenzyl halide. The method further includes reacting the precursor copolymer with a base composition that contains N-allylimidazole to form the cationic copolymer having pendant N-allylimidazolium-containing groups.

DETAILED DESCRIPTION

A cationic copolymer having pendant nitrogen-containing groups is provided. At least some of the pendant nitrogen-containing groups are cationic N-allylimidazolium-containing groups. The copolymer is ionically conductive and can be used for forming an anion exchange membrane. The anion exchange membranes often have improved mechanical properties compared to anion exchange membranes formed from cationic copolymers but without N-allylimidazolium-containing groups. The anion exchange membranes can be used in electrochemical cells such as fuel cells, electrolyzers, batteries, and electrodialysis cells.

The cationic copolymer is formed from a precursor copolymer. The precursor copolymer typically contains a mixture of monomeric units derived from styrene and from a vinylbenzyl halide such as vinylbenzyl chloride. N-allylimidazole is reacted with the precursor copolymer (more specifically with the monomeric units derived from vinylbenzyl halide) to introduce pendant N-allylimidazolium-containing groups that are cationic. Other nitrogen-containing bases can be reacted with the precursor copolymer in addition to N-allylimidazole to introduce other optional cationic, nitrogen-containing groups.

As used herein, "a", "an", and "the" are used interchangeably and mean one or more.

The term "and/or" is used to indicate that one or both stated conditions may occur, for example A and/or B includes, (A and B) and (A or B). That is, it is used to mean A alone, B alone, or A plus B.

The term "alkyl" refers to a monovalent group that is a radical formally derived by abstraction of a hydrogen atom from an alkane. The alkyl can have at least 1, at least 2, at least 3, at least 4, at least 6, or at least 10 carbon atoms and can have up to 18 carbon atoms, up to 12 carbon atoms, up to 10 carbon atoms, up to 6 carbon atoms, or up to 4 carbon atoms. The alkyl can be linear, branched, cyclic, or a combination thereof. A linear alkyl has at least one carbon atom while a cyclic or branched alkyl has at least 3 carbon atoms. In some embodiments, if there are greater than 12 carbon atoms, the alkyl is branched. Examples of linear alkyl groups include methyl, ethyl, n-propyl, n-butyl, n-pentyl, n-hexyl, n-heptyl, and n-octyl groups. Examples of branched alkyl groups include iso-propyl, iso-butyl, sec-butyl, t-butyl, neopentyl, isopentyl, and 2,2-dimethylpropyl groups. Examples of cycloalkyl groups include cyclopropyl, cyclobutyl, cyclopentyl, and cyclohexyl.

The term "copolymer" refers to a polymer formed from two or more monomers. The copolymers are typically random. The terms "copolymer" and "polymer" can be used interchangeably herein.

The term "halo" refers to chloro, bromo, fluoro, or iodo.

The term "heterocyclic ring" refers to a ring structure having carbon atoms and at least 1 heteroatom selected from oxygen, nitrogen, or sulfur, wherein the ring structure is saturated or unsaturated. The heteroatom is often nitrogen or nitrogen plus one or more additional heteroatoms. The heterocyclic ring typically has 5 to 7 ring atoms and 1 to 3 heteroatoms. In some embodiments, the heterocyclic ring contains only nitrogen heteroatoms. Compounds with a heterocyclic ring include, but are not limited to, imidazole, pyridine, piperidine, pyrrole, pyrazole, triazole, tetrazole, pyrimidine, pyrazine, pyridazine, triazine, and piperazine. The heterocyclic ring optionally can be substituted with one or more alkyl groups.

The terms "in a range of" or "in the range of" are used interchangeably to refer to all values within the range plus the endpoints of the range.

Precursor Copolymer

The cationic copolymer with pendant N-allylimidazolium-containing groups is formed from a precursor copolymer. The precursor copolymer typically contains monomeric units derived from styrene as well as monomeric units derived from vinylbenzyl halide, which is usually vinylbenzyl chloride. Other optional monomeric units can be included, if desired, in the precursor copolymer as long as the final cationic copolymer having N-allylimidazolium-containing groups has the desired ionic conductivity, solubility, mechanical strength, and swelling characteristics. The precursor copolymer is typically a random copolymer and is often linear.

In many embodiments, the precursor copolymer is a random copolymer formed from styrene and a vinylbenzyl halide such as vinylbenzyl chloride. Such a precursor copolymer has monomeric units derived from styrene as in Formula (II-1) and monomeric units derived from vinylbenzyl halide as in Formula (II-2A) where X is a halo (e.g., the halo is often chloro).

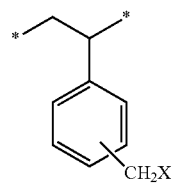

(II-2A)

The resulting precursor copolymer is usually of Formula (VII).

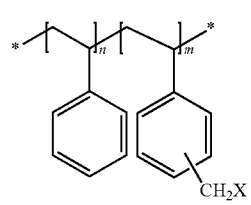

(VII)

In Formula (VII), the variable n is the mole percent of monomeric units derived from styrene and the variable m is the mole percent of monomeric units derived from vinylbenzyl halide in the precursor copolymer. The monomeric units are typically arranged in a random manner. That is, monomeric units of the same type are not all together in a block. The asterisk (*) indicates the attachment to other groups in the copolymer such as, for example, end groups or initiator residue units.

In some embodiments of the precursor copolymer, the sum of the variables n and m is equal to 100 mole percent. That is, the precursor copolymer contains only two types of monomeric units as in Formula (VII). The sum of n and m is often at least 80 mole percent, at least 85 mole percent, at least 90 mole percent, at least 95 mole percent, at least 98 mole percent, at least 99 mole percent, at least 99.5 mole percent, at least 99.8 mole percent, or at least 99.9 mole percent based on the total moles of monomeric units in the precursor copolymer.

The percent of monomeric units derived from vinylbenzyl halide in the precursor copolymer is selected to provide a suitable amount of cationic, nitrogen-containing groups in the cationic copolymer. That is, the cationic, nitrogen-containing groups are introduced into the polymeric material by reaction of nitrogen-containing bases (i.e., N-allylimidazole and any optional nitrogen-containing bases) with the monomeric units derived from vinylbenzyl halide in the precursor copolymer. The mole percent of the monomeric units derived from vinylbenzyl halide in the precursor copolymer is often at least 20 mole percent such as, for example, in the range of 20 to 50 mole percent based on the total moles of monomeric units in the precursor copolymer. If the amount is greater than 50 mole percent, the final copolymer having pendant N-allylimidazolium-containing groups may be too soluble or swellable in water, a water-based solution, or an electrolyte such as within an electrochemical cell. If the amount is less than 20 mole percent, however, the final cationic copolymer having pendant N-allylimidazolium-containing groups may not have sufficient ionic conductivity. The precursor copolymer usually contains at least 20 mole percent, at least 25 mole percent, at least 30 mole percent, at least 35 mole percent, at least 40 mole percent and up to 50 mole percent, up to 45 mole (II-1)

percent, or up to 40 mole percent monomeric units derived from vinylbenzyl halide based on the total moles of monomeric units in the precursor copolymer.

The percent of monomeric units derived from styrene in the precursor copolymer is selected so that the resulting copolymeric material having pendant N-allylimidazolium-containing groups is not soluble in water, a water-based solution, or an electrolyte such as that used within an electrochemical cell. If the amount is too great, however, there may not be enough monomeric units derived from vinylbenzyl halide and the resulting copolymeric material having pendant N-allylimidazolium-containing groups may not be sufficiently ionically conductive. The precursor copolymer often contains at least 50 mole percent such as, for example, 50 to 80 mole percent monomeric units derived from styrene based on the total moles of monomeric units in the precursor copolymer. The amount is often at least 50 mole percent, at least 55 mole percent, at least 60 mole percent, at least 65 mole percent, at least 70 mole percent and up to 80 mole percent, up to 75 mole percent, up to 70 mole percent, or up to 65 mole percent based on the total moles of monomeric units in the precursor copolymer.

In some embodiments, the precursor copolymer contains 20 to 50 mole percent monomeric units derived from vinylbenzyl halide and 50 to 80 mole percent monomeric units derived from styrene based on the total moles of monomeric units in the precursor copolymer. For example, the precursor copolymer can contain 25 to 50 mole percent monomeric units derived from vinylbenzyl halide and 50 to 75 mole percent monomeric units derived from styrene, 30 to 50 mole percent monomeric units derived from vinylbenzyl halide and 50 to 70 mole percent monomeric units derived from styrene, 25 to 45 mole percent monomeric units derived from vinylbenzyl halide and 55 to 75 mole percent monomeric units derived from styrene, 30 to 45 mole percent monomeric units derived from vinylbenzyl halide and 55 to 70 mole percent monomeric units derived from styrene, or 30 to 40 mole percent monomeric units derived from vinylbenzyl halide and 60 to 70 mole percent monomeric units derived from styrene.

The precursor copolymers are usually prepared by mixing the monomers with a thermal initiator. Suitable thermal initiators are often selected from azo compounds such as 2,2'-azobis(isobutyronitrile), 2,2'-azobis(2,4-dimethylpentanenitrile), and 2,2'-azobis(2-methylbutyronitrile), from peroxides such as benzoyl peroxide and lauroyl peroxide, or from mixtures thereof.

The amount of the thermal initiator is often in a range of 0.01 to 5 weight percent based on a total weight of monomers included in the precursor reaction mixture. The amount can be at least 0.01 weight percent, at least 0.05 weight percent, at least 0.1 weight percent, at least 0.5 weight percent, at least 1 weight percent and up to 5 weight percent, up to 4 weight percent, up to 3 weight percent, up to 2 weight percent, or up to 1 weight percent. The amount of thermal initiator can be used to control the molecular weight. That is, an increase in the amount tends to result in the preparation of a lower molecular weight precursor copolymer.

The polymerization reaction to form the precursor copolymer can occur with or without organic solvent and/or water being present in the reaction mixture. That is, the solids content of the precursor reaction mixture can be up to 100 weight percent. The solids content is equal to the percentage of all components in the precursor reaction mixture that are not an organic solvent and/or water. An organic solvent refers to a non-reactive, organic, liquid component. The organic solvent can be added to lower the viscosity of the precursor reaction mixture, to allow suitable mixing of the components, and to facilitate handling of the final polymeric solution. If the solids content is too low, however, the excess organic solvent and/or water needs to be removed. This adds additional cost and time to the preparation of the precursor copolymer. The solids content is often in a range of 30 to 100 weight percent based on a total weight of the precursor reaction mixture. For example, the solids content can be at least 30 weight percent, at least 40 weight percent, at least 50 weight percent, or at least 60 weight percent and up to 100 weight percent, up to 90 weight percent, up to 80 weight percent, or up to 70 weight percent.

The organic solvent, if added to the precursor reaction mixture, is typically selected based on its ability to form a single phase with the monomers and with the resulting precursor copolymer. The organic solvent can be, for example, a ketone (e.g., acetone, methyl ethyl ketone, methyl iso-butyl ketone, and cyclohexanone), an ester such as an alkyl acetate (e.g., ethyl acetate and butyl acetate), or an aromatic hydrocarbon that optionally can be halogenated (e.g., toluene and chlorobenzene).

The molecular weight (e.g., number average molecular weight ($MW_n$)) of the precursor copolymer is often in a range of 20,000 to 100,000 Daltons. If the weight average molecular weight is below 20,000 Daltons, the cationic copolymer formed from the precursor copolymer may not be sufficiently robust to be used as anion exchange membranes in electrochemical cells. On the other hand, if the weight average molecular weight is greater than 100,000 Daltons, the resulting cationic copolymer solutions may have a viscosity that is too high for easy processing. The weight average molecular weight can be at least 20,000 Daltons, at least 30,000 Daltons, at least 40,000 Daltons, or at least 50,000 Daltons and up to 100,000 Daltons, up to 90,000 Daltons, up to 80,000 Daltons, up to 70,000 Daltons, or up to 60,000 Daltons. For example, the weight average molecular weight can be in a range of 40,000 to 100,000 Daltons, in a range of 40,000 to 80,000 Daltons, in a range of 50,000 to 80,000 Daltons, in a range of 40,000 to 70,000 Daltons, or in a range of 50,000 to 70,000 Daltons.

Copolymer with Pendant N-allylimidazolium-Containing Groups

The copolymer having pendant N-allylimidazolium-containing groups, which can be referred to as the cationic copolymer, is formed from the precursor copolymer. More specifically, the precursor copolymer is reacted with N-allylimidazole. In addition to N-allylimidazole, the precursor copolymer can be reacted with additional optional nitrogen-containing bases. Both the N-allylimidazole and any additional optional nitrogen-containing base react with the monomeric units in the precursor copolymer that are derived from vinylbenzyl halide.

Reaction of N-allylimidazole

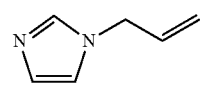

with the monomeric units derived from vinylbenzyl halide results in the formation of the first monomeric units of Formula (I).

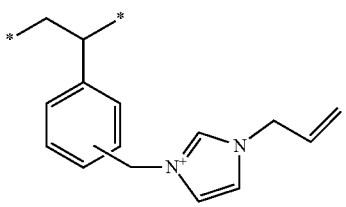

(I)

The optional nitrogen-containing base that is reacted with the precursor copolymer in addition to N-allylimidazole can be any compound that will result in the formation of nitrogen-containing pendant groups when reacted with the monomeric units derived from benzyl halide in the precursor copolymer. Reaction of the optional nitrogen-containing base with the precursor copolymer results in the formation of third monomeric units of Formula (III).

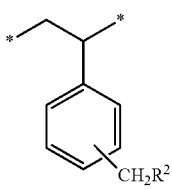

(III)

where group $R^2$ is a cationic, nitrogen-containing group and group —$CH_2R^2$ is in an ortho, para, or meta position of the benzene ring. The $R^2$ group has a nitrogen atom connected to the —$CH_2$— group and this nitrogen atom is typically positively charged.

In some examples, group $R^2$ is derived from a nitrogen-containing base that is a heterocyclic compound that has at least one nitrogen heteroatom. The heterocyclic compound can optionally include additional heteroatoms such as nitrogen, oxygen, or sulfur heteroatoms. In many embodiments, the heterocyclic compound contains either one or two nitrogen heteroatoms and no additional heteroatoms. The heterocyclic compound contains a heterocyclic ring that typically has 5 to 7 ring members (e.g., 5 or 6 ring members) and that can be saturated or unsaturated (e.g., fully as in an aromatic ring or partially unsaturated). The heterocyclic ring can be unsubstituted or substituted with one or more alkyl groups.

Some examples of suitable optional nitrogen-containing bases are heterocyclic compounds such as alkyl-substituted imidazole compounds of Formula (VIII).

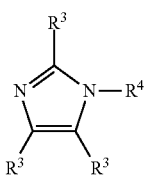

(VIII)

In Formula (VIII), each $R^3$ is hydrogen or alkyl and $R^4$ is alkyl. The alkyl groups typically have 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples of Formula (VIII) include, but are not limited to, N-methylimidazole, 1,2-dimethylimidazole, N-butylimidazole, and 1,2,4,5-tetramethylimidazole.

The reaction of nitrogen-containing bases of Formula (VIII) with monomeric units derived from vinylbenzyl halide in the precursor copolymer result in the formation of third monomeric units of Formula (IV) in the cationic copolymer.

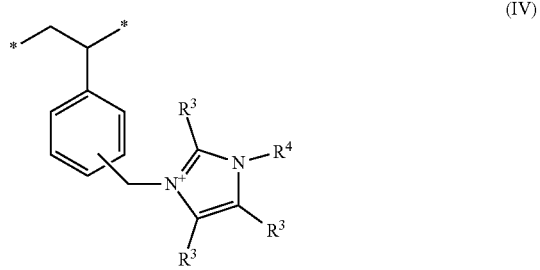

(IV)

In Formula (IV), groups $R^3$ and $R^4$ are the same as defined for Formula (VIII) above.

Other examples of suitable optional nitrogen-containing bases are heterocyclic compounds such as pyridine and alkyl-substituted pyridine compounds of Formula (IX).

(IX)

Each $R^5$ in Formula (IX) is hydrogen or alkyl. The alkyl groups typically have 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Pyridine is a specific example of Formula (IX).

The reaction of nitrogen-containing bases of Formula (IX) with monomeric units derived from vinylbenzyl halide in the precursor copolymer result in the formation of third monomeric units of Formula (V) in the cationic copolymer.

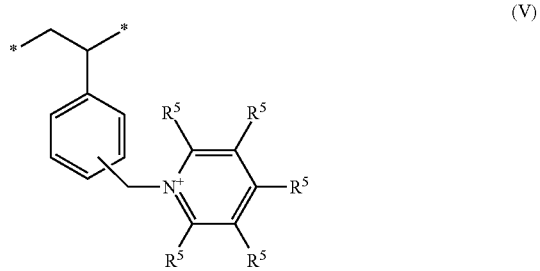

(V)

In Formula (V), group $R^5$ is the same as defined for Formula (IX) above.

Still other suitable optional nitrogen-containing bases that can be reacted with the precursor copolymer include unsaturated heterocyclic compounds with a five-membered ring such as pyrrole, pyrazole, triazole, and tetrazole as well as unsaturated compounds with a six-membered ring such as pyrimidine, pyrazine, pyridazine, and triazine. Saturated nitrogen-containing bases such as piperidine and piperazine can also be used. Any of these compounds can be substituted with one or more alkyl groups.

Other suitable optional nitrogen-containing bases are trialkylamine compounds of Formula (X) can be used to introduce optional cationic, nitrogen-containing groups into the cationic copolymer. The trialkylamine compound is often of Formula (X).

In Formula (X), groups $R^6$, $R^7$, and $R^8$ are each independently an alkyl. Suitable alkyl groups often contain 1 to 10 carbon atoms, 1 to 6 carbon atoms, 1 to 4 carbon atoms, or 1 to 3 carbon atoms. The alkyl groups can be linear, branched, or cyclic (depending on the number of carbon atoms). Specific examples include, but are not limited to, trimethylamine, triethylamine, ethyldimethylamine, butyldimethylamine, and diisopropylethylamine.

The reaction of nitrogen-containing bases of Formula (X) with monomeric units derived from vinylbenzyl halide in the precursor copolymer result in the formation of third monomeric units of Formula (VI)

where $R^6$, $R^7$, and $R^8$ are the same as described above for Formula (X).

Still other suitable optional nitrogen-containing bases that can be reacted with the precursor copolymer include guanidine compounds that are substituted with a plurality of alkyl groups. In some embodiments, the guanidinium group is fully substituted with alkyl groups. Suitable alkyl groups often contain 1 to 10 carbon atoms, 1 to 6 carbon atoms, 1 to 4 carbon atoms, or 1 to 3 carbon atoms, and the alkyl groups can be linear, branched, or cyclic (depending on the number of carbon atoms). Examples include, but are not limited to, pentamethylguanidine, 2-tert-butyl-1,1,2,2-tetramethylguanadine, and N,N-diethyl-N,N',N'-trimethylguanidine as well as cyclic and polycyclic compounds such as 2-methylimino-1,3-dimethylimidazolidine and 7-methyl-1,5,7-triazabicyclo[4.4.0]dec-5-ene.

The various nitrogen-containing bases, which include N-allylimidazole plus any optional nitrogen-containing bases, are used to introduce pendant nitrogen-containing groups and form the cationic copolymer. More particularly, the nitrogen-containing bases react with monomeric units derived from vinylbenzyl halide in the precursor copolymer. While reacting all the available monomeric units with the nitrogen-containing base may increase the total ionic conductivity, adding more positively charged groups into the cationic copolymer tends to increase its swelling and solubility in water or water-based solutions such as used in various electrolytes within electrochemical cells. While increased ionic conductivity is desirable for use in electrochemical cells, increased swelling and solubility tends to be undesirable. The mole percent of the monomeric units derived from reacted vinylbenzyl halide is often a compromise between ionic conductivity on one hand and swelling and solubility on the other hand. Typically, the total moles of the nitrogen-containing bases are selected to react with at least 60 mole percent, at least 65 mole percent, at least 70 mole percent, at least 75 mole percent, at least 80 mole percent, at least 85 mole percent and up to 100 mole percent, up to 99 mole percent, up to 97 mole percent, up to 95 mole percent, up to 90 mole percent, up to 85 mole percent, or up to 80 mole percent of the monomeric units derived from vinylbenzyl chloride. Often, the total moles of the nitrogen-containing base are selected to be less than the moles of monomeric units derived from vinylbenzyl halide to avoid an excess of the nitrogen-containing base present in the final product solution.

When prepared for use in an electrochemical cell, the cationic copolymer often contains 20 mole percent to 50 mole percent nitrogen-containing monomeric units based on the total moles of monomeric units in the cationic copolymer. These nitrogen-containing monomeric units are typically cationic. If lower amounts of the nitrogen-containing monomeric units (i.e., less than 20 mole percent based on the total moles of monomeric units) are present, the resulting cationic copolymer may not have enough ionic conductivity. If higher amounts of the nitrogen-containing monomeric units are present, however, the resulting cationic copolymer may be too soluble and/or swell too much when used as an anion exchange membrane in an electrochemical cell. The cationic copolymer can contain at least 20 mole percent, at least 25 mole percent, at least 30 mole percent, at least 35 mole percent, or at least 40 mole percent and up to 50 mole percent, up to 45 mole percent, up to 40 mole percent, up to 35 mole percent, or up to 30 mole percent cationic, nitrogen-containing monomeric units. In many embodiments, all the nitrogen-containing monomeric units are first monomeric units of Formula (I) or a mixture of first monomeric units of Formula (I) and third monomeric units of Formula (III).

Of the cationic, nitrogen-containing monomeric units in the cationic copolymer, 5 to 100 percent are of Formula (I).

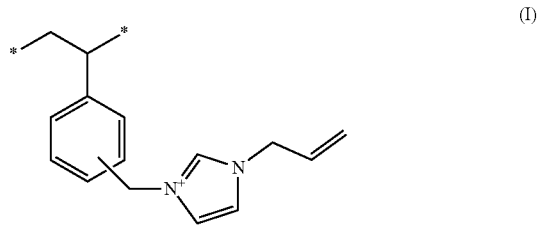

At least 5 percent, at least 10 percent, at least 15 percent, at least 20 percent, at least 25 percent, at least 30 percent, at least 40 percent, or at least 50 percent and up to 100 percent, up to 95 percent, up to 90 percent, up to 80 percent, up to 70 percent, up to 60 percent, up to 50 percent, up to 40 percent, up to 30 percent, or up to 20 percent of the cationic, nitrogen-containing monomeric units are of Formula (I). In some embodiments, 10 to 100 percent, 20 to 100 percent, 30 to 100 percent, 40 to 100 percent, 10 to 90 percent, or 10 to 80 percent, 20 to 80 percent, 30 to 80 percent, 40 to 80 percent, or 40 to 60 percent of the cationic, nitrogen-containing monomeric units in the cationic copolymer are of Formula (I). The cationic, nitrogen-containing monomeric units that are not first monomeric units of Formula (I) are typically third monomeric units of Formula (III).

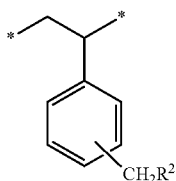

(III)

where $R^2$ is a cationic, nitrogen-containing group.

In many embodiments, 5 to 100 percent of the cationic monomeric units are of Formula (I) and 0 to 95 percent are of Formula (III). In some embodiments, 10 to 100 percent of the cationic monomeric units are of Formula (I) and 0 to 90 percent are of Formula (III). In still other embodiments, the cationic monomer units are 20 to 90 percent of Formula (I) and 10 to 80 percent of Formula (III), 20 to 80 percent of Formula (I) and 20 to 80 percent of Formula (III), 30 to 70 percent of Formula (I) and 30 to 70 percent of Formula (III), or 40 to 60 percent of Formula (I) and 40 to 60 percent of Formula (III).

Particularly when the cationic copolymer is prepared for use in an electrochemical cell, the total content of cationic, nitrogen-containing monomeric units is in a range of 20 to 50 mole percent and the cationic, nitrogen-containing monomeric units are first monomeric units of Formula (I) or are a mixture of first monomeric units of Formula (I) and third monomeric units of Formula (III). The total content of cationic, nitrogen-containing monomeric units is at least 20 mole percent, at least 25 mole percent, at least 30 mole percent, or at least 35 mole percent and up to 50 mole percent, up to 45 mole percent, up to 40 mole percent, up to 35 mole percent, or up to 30 mole percent. The mole percent amounts are based on the total number of moles in the cationic copolymer.

In many embodiments where the total content of cationic, nitrogen-containing monomeric units is in a range of 20 to 50 mole percent, the first monomeric units of Formula (I) are in a range of 1 to 50 mole percent and any remaining cationic, nitrogen-containing monomeric units are typically third monomeric units of Formula (III). The first monomeric units of Formula (I) are often at least 1 mole percent, at least 2 mole percent, at least 5 mole percent, at least 10 mole percent, at least 15 mole percent, at least 20 mole percent, or at least 25 mole percent and up to 50 mole percent, up to 40 mole percent, or up to 30 mole percent. The mole percent amounts are based on the total number of moles in the cationic copolymer.

In addition to the first monomeric units of Formula (I) and the third monomeric units of Formula (III), the cationic copolymer further contains one or more second monomeric units. The second monomeric units are selected from those of Formula (II-1), Formula (II-2), or both.

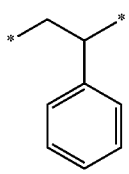

(II-1)

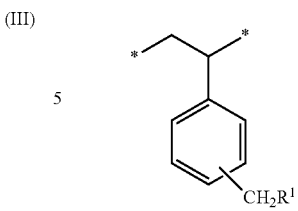

(II-2)

In Formula (II-2), $R^1$ is halo, hydroxy, or alkoxy. The second monomeric units of Formula (II-1) are monomeric units derived from styrene in the precursor copolymer. The second monomeric units of Formula (II-2) are monomeric units derived from vinylbenzyl halide in the precursor copolymer. Monomeric units with $R^1$ equal to hydroxy or alkoxy typically result from reaction of any remaining monomeric units derived from vinylbenzyl halide with a hydroxide-containing base an alcohol, water, or a mixture thereof.

The total amount of second monomeric units of Formula (II-1) and/or Formula (II-2) are in a range of 50 to 80 mole percent based on the total moles of monomeric units in the cationic copolymer. If the amount is greater than 80 mole percent, there may be an insufficient amount of the cationic, nitrogen-containing monomeric units in the cationic copolymer. The ionic conductivity of the resulting cationic copolymer may not be suitable for use in an electrochemical cell. If the amount is less than 50 mole percent, however, the cationic copolymer may be too soluble and/or may swell excessively in the water, water-based solutions, or various electrolytes included in an electrochemical cell. The total amount of the second monomeric units is often at least 50 mole percent, at least 55 mole percent, at least 60 mole percent, at least 65 mole percent, or at least 70 mole percent and up to 80 mole percent, up to 75 mole percent, up to 70 mole percent, or up to 65 mole percent based on the total moles of monomeric units in the cationic copolymer.

The monomeric units of Formula (II-1) are often present in an amount of 50 to 80 mole percent based on total moles of monomeric units in the cationic copolymer. The monomeric units of Formula (II-1) can be adjusted to increase or decrease the number of nitrogen-containing monomeric units of Formula (I) and/or Formula (III). Increasing the number of monomeric units derived from styrene can be used to decrease solubility and/or swelling of the cationic copolymer in water, water-based solutions, or various electrolytes such as those used in an electrochemical cell. If the amount of the monomeric units derived from styrene is too high, however, the resulting cationic copolymer may not have enough ionic conductivity. The cationic copolymer often contains at least 50 mole percent, at least 55 mole percent, at least 60 mole percent, at least 65 mole percent, or at least 70 mole percent and up to 80 mole percent, up to 75 mole percent, up to 70 mole percent, or up to 65 mole percent monomeric units of Formula (II-1) based on total moles of monomeric units in the cationic copolymer. For example, the cationic copolymer can contain 50 to 80 mole percent, 50 to 75 mole percent, 50 to 70 mole percent, 55 to 80 mole percent, 55 to 75 mole percent, 55 to 70 mole percent, 60 to 80 mole percent, 60 to 75 mole percent, or 60 to 70 mole percent monomeric units of Formula (II-1).

The cationic copolymer may contain second monomeric units of Formula (II-2). These monomeric units result from monomeric units in the precursor copolymer that were derived from vinylbenzyl halide. More particularly, these monomeric units can result from the incomplete conversion of the vinylbenzyl halide monomeric units in the precursor copolymer to cationic monomeric units of Formula (I) or Formula (III) in the cationic copolymer. The amount of the monomeric units of Formula (II-2) is often in a range of 0 to 20 mole percent based on total moles of monomeric units in the cationic copolymer. The amount can be at least 1 mole percent, at least 2 mole percent, at least 3 mole percent, at least 5 mole percent, at least 10 mole percent and can be up to 20 mole percent, up to 15 mole percent, or up to 10 mole percent. For example, the amount can be in a range of 1 to 20 mole percent, 5 to 20 mole percent, 10 to 20 mole percent, 0 to 15 mole percent, 1 to 15 mole percent, 5 to 15 mole percent, 0 to 10 mole percent, 1 to 10 mole percent, 0 to 5 mole percent, or 1 to 5 mole percent.

The monomeric units of Formula (II-2) can have a group $R^1$ that is halo, hydroxy, or alkoxy. The hydroxy and alkoxy groups respectively can be formed, for example, by reaction of halo-containing groups (i.e., —$CH_2X$ groups) with a hydroxide-containing base, an alcohol, water, or a mixture thereof.

In some embodiments, the cationic copolymers contain 50 to 80 mole percent monomeric units of Formula (II-1) and 0 to 20 mole percent monomeric units of Formula (II-2), 50 to 80 mole percent monomeric units of Formula (II-1) and 1 to 20 mole percent monomeric units of Formula (II-2), 50 to 80 mole percent monomeric units of Formula (II-1) and 0 to 10 mole percent monomeric units of Formula (II-2), 50 to 80 mole percent monomeric units of Formula (II-1) and 1 to 10 mole percent monomeric units of Formula (II-2), 50 to 70 mole percent monomeric units of Formula (II-1) and 0 to 20 mole percent monomeric units of Formula (II-2), 50 to 70 mole percent monomeric units of Formula (II-1) and 0 to 10 mole percent monomeric units of Formula (II-2), 50 to 70 mole percent monomeric units of Formula (II-1) and 1 to 10 mole percent monomeric units of Formula (II-2), 60 to 70 mole percent monomeric units of Formula (II-1) and 0 to 20 mole percent monomeric units of Formula (II-2), 60 to 70 mole percent monomeric units of Formula (II-1) and 0 to 10 mole percent monomeric units of Formula (II-2), or 60 to 70 mole percent monomeric units of Formula (II-1) and 1 to 10 mole percent monomeric units of Formula (II-2).

Some cationic copolymers contain 20 to 50 mole percent cationic monomer units selected from the first monomeric units of Formula (I) or from a mixture of first monomeric units of Formula (I) and third monomeric units of Formula (III), 50 to 80 mole percent monomeric units of Formula (II-1), and 0 to 20 mole percent monomeric units of Formula (II-2). The amounts are based on the total moles of monomeric units in the cationic copolymer. Of the 20 to 50 mole percent cationic monomeric units, typically 1 to 50 mole percent are first monomeric units of Formula (I) with the remainder being third monomeric units of Formula (III).

The cationic, nitrogen-containing groups have a corresponding anion to balance the charge. The anion is often a halide (e.g., chloride, bromide, or iodide), bicarbonate, carbonate, or hydroxide.

The nitrogen-containing bases are typically added to the precursor copolymer in the presence of one or more organic solvents. Water may also be present. The solvent system is selected so that the final product (i.e., the cationic, nitrogen-containing copolymer, which is the cationic copolymer) is dissolved. The solvent system may or may not dissolve the precursor copolymer. That is, the initial reaction mixture can be either a solution or a slurry. If the initial reaction mixture is a slurry, the solvent system is usually selected so that resulting cationic copolymer is dissolved. Suitable solvents that can dissolve both the precursor copolymer as well as the cationic copolymer include N, N-dimethylformamide, N, N-dimethylacetamide, N-methylpyrrolidinone, and dimethyl sulfoxide. Suitable solvents that can dissolve the cationic copolymer but not the precursor copolymer include, but are not limited to, methanol, ethanol, 1-methoxy-2-propanol, and blends of these with toluene. The reaction mixture is often heated at an elevated temperature for at least 30 minutes, at least 1 hour, or even more. The weight percent solids are often in a range of 10 to 60 weight percent, 20 to 50 weight percent, or 20 to 40 weight percent.

Anion Exchange Membrane in Electrochemical Cells

The cationic copolymer can be used to form an anion exchange membrane in an electrochemical cell. When used as an anion exchange membrane, the cationic copolymer is often present as a layer having a thickness in a range of 10 to 500 micrometers or greater. The thickness can be at least 10 micrometers, at least 20 micrometers, at least 30 micrometers, at least 40 micrometers, or at least 50 micrometers and up to 500 micrometers or greater, up to 400 micrometers, up to 300 micrometers, up to 200 micrometers, up to 100 micrometers, or up to 50 micrometers.

In some embodiments, the anion exchange membrane further includes a reinforcement material such as a porous support. The porous support can be a woven or non-woven material made of a polymeric material such as, for example, fluoropolymers (e.g., polytetrafluoroethylene) or polyolefins (e.g., polyethylene or polypropylene), electrospun fibers, fiberglass, polymer fibers, fiber mats, perforated films, and porous ceramics. The reinforcement material can be imbibed (e.g., saturated or coated) with a liquid composition containing the cationic copolymer described herein either neat or containing solvent (e.g., dissolved in a suitable solvent), followed by removal of the solvent (if present) to embed the cationic copolymer into the pores of the reinforcement material. The porous support is generally electrically non-conductive.

The anion exchange membranes can be characterized by percent swelling. The percent swelling can be determined by the linear expansion ratio, for example, either in the chloride form or in the hydroxide form, which can be determined using the difference between wet and dry dimensions of a membrane sample (e.g., a sample measuring for example, 5 cm in length and 5 cm in width or measuring 3 cm in length and 1 cm in width) using equation (1):

$$SW(\%) = \frac{X_{wet} - X_{dry}}{X_{dry}} \times 100\% \quad (1)$$

where $X_{wet}$ and $X_{dry}$ are the lengths of a wet and a dry membrane, respectively.

The percent swelling depends on the anion selected to neutralize the cationic charges in the cationic copolymer. The percent swelling in the chloride form can be less than about 60%, less than about 50%, less than about 40%, less than about 30%, less than about 20%, less than about 10% or less than about 5%. The percent swelling in the hydroxide form can be less than about 90%, less than about 85%, less than about 80%, less than about 75%, less than about 70%, less than about 65%, less than about 60%, less than about 55%, less than about 50%, less than about 45%, less than about 40%, less than about 35%, or less than about 30%.

The cationic copolymers included in the membranes are not soluble in water or other liquid compositions included in electrochemical cells. The solubility is often less than 5 weight percent, less than 4 weight percent, less than 3 weight percent, less than 2 weight percent, less than 1 weight percent, less than 0.5 weight percent, or less than 0.1 weight percent when in contact with water for 24 hours at room temperature (e.g., 20 to 25° C.).

Surprisingly, the anion exchange membranes typically have good mechanical strength in the absence of crosslinking. The good mechanical strength is evidenced by increased stress at break with the use of monomeric units having N-allylimidazolium groups. The good mechanical strength results in the membranes being easy to manipulate and handle without breaking. Favorable ionic conductivity values can be obtained even for anion exchange membranes having increased stress at break.

The anion exchange membranes can be placed between two electrodes, the anode and cathode, of an electrochemical device. The electrochemical device often further includes catalyst layers that can be coated and/or laminated on either one or both gas diffusion layers or on one or both sides of the anion exchange membrane. An anion exchange membrane with at least one laminated and/or coated catalyst layer can be referred to as a catalyst coated membrane (CCM). In some embodiments, each electrode is a gas diffusion electrode comprising a gas diffusion layer coated with a catalyst. Gas diffusion layers are known in the art and include for example carbon paper or cloth, or a metal mesh. In other embodiments, one or both sides of the anion exchange membrane can be laminated to a catalyst layer.

Examples of electrochemical devices include, but are not limited to, fuel cells, electrolyzers, batteries, or electrodialysis cells.

Electrode materials can include, for example, graphitic carbon, glassy carbon, titanium, or any of the following "catalytically active elements": V, Cr, Mn, Fe, Co, Ni, Cu, Zn, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the cathode of the electrochemical device comprises a catalytically active species comprising silver, gold, copper, nickel, iron, or combinations thereof.

In one embodiment, the anode of the electrochemical device comprises a catalytically active species comprising ruthenium, iridium, platinum, titanium, nickel, iron, cobalt, or combinations thereof.

In one embodiment, the electrochemical device is substantially free of platinum, meaning the electrodes comprise less than 0.1 weight percent, less than 0.01 weight percent or even less than 0.001 weight percent platinum based on the total weight of the electrode.

The cathode, the anode, the catalysts, and the anion exchange membranes can be assembled each as a separate component or can be fabricated wherein the anion exchange membrane (or a portion thereof) is fabricated with one or both electrodes or a portion thereof. For example, to maximize cost savings and, in some instances, performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The assembly can include the anion exchange membrane and at least one catalyst layer and/or at least one electrode layer. One example assembly includes an anion exchange membrane laminated to a first catalyst layer on a first side and/or laminated to a second catalyst layer on a second side opposite the first side. Other example assembly layers include an anode gas diffusion layer, an anode catalyst, an anion exchange membrane, a cathode catalyst, and a cathode gas diffusion layer. Still other example assembly layers include an anode, an anion exchange membrane, and a cathode.

An assembly comprising the anode, cathode and anion exchange membranes can be sandwiched between two flow field plates and then held together such that each layer is in contact, preferably intimate contact with the adjacent layers.

Various embodiments are provided such as cationic copolymers, anion exchange membranes containing the cationic copolymer, electrochemical cells containing the cationic copolymers, and methods of making the cationic copolymers.

Embodiment 1A provides a cationic copolymer. The cationic copolymer contains a) a first monomeric unit of Formula (I)

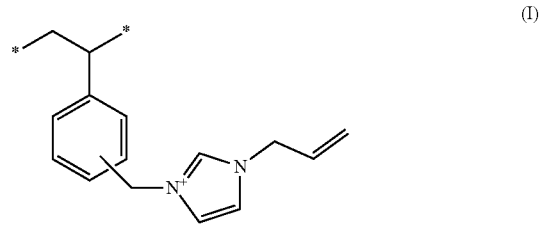

having a pendant N-allylimidazolium group in an ortho, para, or meta position of the benzene ring and b) a second monomeric unit of Formula (II-1), Formula (II-2) or a mixture thereof.

In Formula (II-2), $R^1$ is halo, hydroxy, or alkoxy and the pendant group —$CH_2R^1$ is in an ortho, para, or meta position of the benzene ring. Any cationic group in the cationic copolymer has a corresponding anionic group and each asterisk (*) indicates a point of attachment to another group or monomeric unit in the cationic copolymer.

Embodiment 2A is the cationic copolymer of embodiment 1A, wherein the cationic copolymer comprises 50 to 80 mole percent monomeric units of Formula (II-1), Formula (II-2), or a mixture thereof.

Embodiment 3A is the cationic copolymer of embodiment 1A or 2A, wherein the cationic copolymer further comprises third monomeric units of Formula (III)

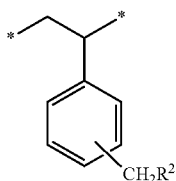
(III)

wherein group $R^2$ is a cationic, nitrogen-containing group and group —$CH_2R^2$ is in an ortho, para, or meta position.

Embodiment 4A is the cationic copolymer of embodiment 3A, wherein $R^2$ of the third monomeric units is a cationic, nitrogen-containing heterocyclic group optionally substituted with one or more alkyl groups.

Embodiment 5A is the cationic copolymer of embodiment 4A, wherein the cationic, nitrogen-containing heterocyclic group is imidazolium substituted with one or more alkyl groups, pyridinium, or pyridinium substituted with one or more alkyl groups.

Embodiment 6A is the cationic copolymer of any one of embodiments 3A to 5A, wherein the third monomeric unit is of Formula (IV)

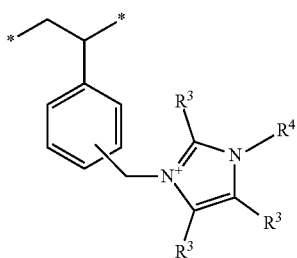
(IV)

wherein
$R^3$ is hydrogen or alkyl; and
$R^4$ is alkyl.

Embodiment 7A is the cationic copolymer of embodiment 3A or 4A, wherein the third monomer is of Formula (V)

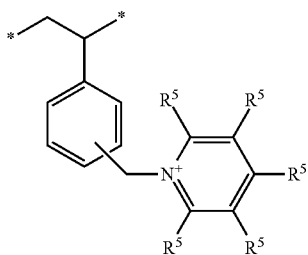
(V)

wherein $R^5$ is hydrogen or alkyl.

Embodiment 8A is the cationic copolymer of embodiment 3A, wherein $R^2$ is of formula $(NR^6R^7R^8)^+$ wherein $R^6$, $R^7$, and $R^8$ are each independently an alkyl.

Embodiment 9A is the cationic copolymer of embodiment 3A, wherein $R^2$ is a guanidium group that is fully substituted with alkyl groups.

Embodiment 10A is the cationic copolymer of any one of embodiments 1A to 9A, wherein the cationic copolymer comprises 20 to 50 mole percent monomeric units having a cationic, nitrogen-containing group comprising the first monomeric units of Formula (I) or a mixture of the first monomeric units of Formula (I) and the third monomeric units of Formula (III).

Embodiment 11A is the cationic copolymer of embodiment 10A, wherein the monomeric units having a cationic, nitrogen-containing groups are 5 to 100 mole percent first monomeric units of Formula (I) and 0 to 95 mole percent third monomeric units of Formula (III).

Embodiment 12A is the cationic copolymer of embodiment 10A or 11A, wherein the monomeric units having a cationic, nitrogen-containing group are 10 to 100 mole percent first monomeric units of Formula (I) and 0 to 90 mole percent third monomeric units of Formula (III).

Embodiment 13A is the cationic copolymer of any one of embodiments 1A to 11A, wherein the cationic copolymer comprises:
  20 to 50 mole percent monomeric units having a cationic, nitrogen-containing group comprising the first monomeric units of Formula (I) or a mixture of the first monomeric units of Formula (I) and the third monomeric units of Formula (III) based on total moles of monomeric units in the cationic copolymer;
  50 to 80 mole percent second monomeric units of Formula (II-1) based on total moles of monomeric units in the cationic copolymer; and
  0 to 20 mole percent second monomeric units of Formula (II-2) based on total moles of monomeric units in the cationic copolymer.

Embodiment 1B is an anion exchange membrane. The anion exchange membrane contains the cationic copolymer of Embodiment 1A.

Embodiment 2B is the anion exchange membrane of embodiment 1B, wherein the cationic copolymer is of Embodiment 2A to 13A.

Embodiment 3B is the anion exchange membrane of embodiment 1B or 2B, wherein the anion exchange membrane further comprises a reinforcement material.

Embodiment 4B is the anion exchange membrane of any one of embodiments 1B to 3B, further comprising a catalyst layer adjacent to a first major surface and/or a second major surface of the anion exchange membrane.

Embodiment 1C is an electrochemical cell. The electrochemical cell contains an anion exchange membrane that includes the cationic copolymer of embodiment 1A.

Embodiment 2C is the electrochemical cell of embodiment 1D, wherein the anion exchange membrane is of any one of Embodiments 2B to 4B.

Embodiment 3C is the electrochemical cell of embodiment 1C or 2C, wherein the electrochemical cell further comprises a first catalyst layer and/or a second catalyst layer.

Embodiment 4C is the electrochemical cell of embodiment 3C, wherein the first catalyst and/or second catalyst is laminate to the anion exchange membrane.

Embodiment 5C is the electrochemical cell of embodiment 3C, wherein the anode and the cathode are each gas diffusion electrodes and wherein the gas diffusion electrode comprises a gas diffusion layer coated with a catalyst.

Embodiment 1D is a method of making a cationic copolymer having pendant N-allylimidazolium-containing groups. The method includes providing a precursor copolymer comprising monomeric units derived from styrene and monomeric units derived from vinylbenzyl halide. The method further includes reacting the precursor copolymer with a base composition that contains N-allylimidazole to form the cationic copolymer having pendant N-allylimidazolium-containing groups.

Embodiment 2D is the method of embodiment 1D, wherein the precursor copolymer is of Formula (X)

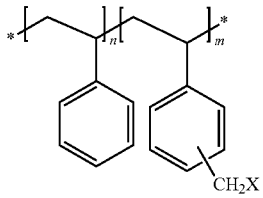
(X)

wherein n refers to the mole percent of monomeric units derived from styrene and m refers to the mole percent of monomeric units derived from vinylbenzyl halide. The sum n+m is in a range of 80 to 100 mole percent.

Embodiment 3D is the method of embodiment 1D or 2D, wherein the precursor copolymer has a weight average molecular weight in a range of 20,000 to 100,000 Daltons.

Gel Permeation Chromatography (GPC)

Styrene/vinylbenzyl chloride copolymer samples were analyzed by GPC with light scattering detection (GPC/LS) to measure absolute or standardless (i.e, without the use of standard solutions) molecular weights. A National Institute of Standards and Technology (NIST) polystyrene standard was used as a reference (broad molecular mass distribution, certified $M_w$=2.85E+05 g/mol±0.23E+05 g/mol, vs. measured $M_w$=2.53E+05 g/mol±0.15E+05 g/mol). Submitted samples were prepared singly and injected in duplicate. Solutions of known concentration (target 2-5 mg/mL) were prepared in tetrahydrofuran (THF, stabilized with 250 ppm butylated hydroxytoluene (BHT)) in glass scintillation vials. The vials were swirled for at least 4 hours to allow dissolution. The solutions were filtered through 0.45 micrometer polytetrafluoroethylene (PTFE) syringe filters and analyzed by GPC. An Agilent (Santa Clara, CA) 1260 LC instrument was used with a Waters Styragel HR 5E, 300×7.8 mm I.D at 40° C. A Wyatt Technology Corporation (Goleta, CA) "DAWN HELEOS-II" 18 angle Light Scattering detector and a Wyatt Technology Corporation Optilab T-rEX Differential Refractive Index (DRI) detector were used. ASTRA 6 from Wyatt Technology Corporation was used for data collection and analysis.

EXAMPLES

TABLE 1

Materials

| Material | Abbreviation | Description |
|---|---|---|
| Tetramethylimidazole | TMIM | Available as "T0971" from TCI America (Portland, OR) |
| N-allylimidazole | AllyIM | Available as "L11053" from Alfa Aesar (Ward Hill, MA) |
| 1,2-Dimethylimidazole | DMIM | Available as "B23544" from Alfa Aesar (Ward Hill, MA) |
| N-Propylimidazole | N-Propyl IM | Available as "P1991" from TCI America (Portland, OR) |
| N,N-Dimethylallylamine | $Me_2$N-Allyl | Available as "D1160" from TCI America (Portland, OR) |
| Methoxypropanol | MP | Available from Alfa Aesar (Ward Hill, MA) |
| 1N Potassium hydroxide solution <1 ppm metals | KOH | Available from J. T. Baker, Baker Analyzed Reagent, VWR Scientific |
| 2,4,6-Trimethylbenzoylphenyl-phosphinic acid ethyl ester | TPOL | Available as "TPO-L" from BASF (Florham Park, NJ) |
| Styrene | St | Available as "S4972-4L" from Sigma Aldrich (Milwaukee, WI) |
| Vinylbenzyl chloride | VBC | Available as product "338729" from Sigma Aldrich (Milwaukee, WI) |
| Chlorobenzene | — | Available as "22921" from Alfa Aesar (Ward Hill, MA) |
| Azobis(isobutyronitrile) | AIBN | Available as "441090-100G" from Sigma-Aldrich (Milwaukee, WI) |
| Methanol | MeOH | Available from J. T. Baker Avantor Performance Materials (Center Valley, PA) |
| Deuterated chloroform | $CDCl_3$ | Available from Cambridge Isotope Laboratories, Inc. (Andover, MA) |
| Deuterated acetonitrile | $CD_3CN$ | Available from Cambridge Isotope Laboratories, Inc. (Andover, MA) |
| Deuterated dimethylformamide | — | Available from Cambridge Isotope Laboratories, Inc. (Andover, MA) |
| Divinylbenzene | DVB | 80% technical grade, available as "414565" from Sigma Aldrich (Milwaukee, WI) |
| $CO_2$ Cathode | Ag electrode | Dioxide Materials, Inc. (Boca Raton, FL) |
| $CO_2$ Anode | $IrO_2$ electrode | Dioxide Materials, Inc. (Boca Raton, FL) |
| $KHCO_3$ | $KHCO_3$ powder, 99.7%, ACS reagent | Available from Sigma-Aldrich Co., LLC, St. Louis, Missouri |
| $CO_2$ | Carbon dioxide gas, 99.999%, Research grade | Oxygen Service Co. (St. Paul, MN) |

Preparation of Precursor Copolymers and Cationic Copolymers

Preparation of Styrene/Vinylbenzyl Chloride Precursor Copolymer

A 1-liter amber glass screw top bottle was charged with 170 grams styrene (no inhibitor removal), 141.2 grams vinylbenzyl chloride (no inhibitor removal; St/VBC molar ratio 64/36), 244.4 grams chlorobenzene, and 2.92 grams AIBN initiator. The mixture was shaken to dissolve initiator, then sparged for 4 minutes under a nitrogen stream. The bottle was capped and placed in an agitated water bath at 60° C. for 24 hours. This gave a clear, viscous polymer solution. The residual monomer content (styrene+vinylbenzyl chloride) of 22.5 mole % was determined by analysis of the proton NMR spectrum of the product solution in $CDCl_3$.

The product solution (530.7 grams) was poured into 2.5 liters of methanol in a 4-liter beaker under mechanical stirring. Stirring was continued for several hours to break up the solid mass, then the precipitate settled, and the solvent layer was drawn off. It was replaced with a fresh 2.5-liter portion of methanol and stirring was resumed. This sequence was continued for a total of four methanol washes. The resulting white solid was allowed to dry at room temperature in air, yielding 232.8 grams copolymer. The solid was treated in a blender to break down remaining large particles and give a uniform fine powder.

The styrene/vinylbenzyl chloride mole ratio was determined to be 62/38 with a residual monomer content of 0.9 mole % via analysis of the proton NMR spectrum of the copolymer in $CDCl_3$. Gel permeation chromatography (GPC) analysis in tetrahydrofuran (THF) showed $MW_n$ equal to 57000 Daltons and polydispersity of 1.39.

Preparation of Copolymer C1

A 250 ml 3-necked round bottom (3NRB) flask equipped with magnetic stirring, heating mantle, thermocouple, and inlet for nitrogen blanketing was charged with 10 grams styrene/vinylbenzyl chloride copolymer (St/VBC, composition 62-64 mol % styrene, 36-38 mol % VBC, $MW_n$ 55-60 kDaltons, and polydispersity 1.3), tetramethylimidazole (to a total of 0.85 mole equivalents relative to benzyl chloride), and 1-methoxy-2-propanol (26.8 grams). The mixture was stirred at 70° C. for 48 hours, resulting in a pale yellow solution.

Preparation of Copolymer C2

A 250 ml 3NRB flask equipped with magnetic stirring, heating mantle, thermocouple, and inlet for nitrogen blanketing was charged with 10 grams styrene/vinylbenzyl chloride copolymer (St/VBC, composition 62-64 mol % styrene, 36-38 mol % VBC, $MW_n$ 55-60 kDaltons, and polydispersity 1.3), N-propylimidazole (to a total of 0.85 mole equivalents relative to benzyl chloride), and 1-methoxy-2-propanol (26.8 grams). The mixture was stirred at 70° C. for 48 hours, resulting in a pale yellow solution.

Preparation of Copolymer C3

A 250 ml 3NRB flask equipped with magnetic stirring, heating mantle, thermocouple, and inlet for nitrogen blanketing was charged with 10 grams styrene/vinylbenzyl chloride copolymer (StVBC, composition 62-64 mol % styrene, 36-38 mol % VBC, $MW_n$ 55-60 kDaltons, and polydispersity 1.3), N,N-dimethylallylamine (to a total of 0.85 mole equivalents relative to benzyl chloride), and 1-methoxy-2-propanol (26.8 grams). The mixture was stirred at 70° C. for 48 hours, resulting in a pale yellow solution.

Preparation of Polymers E1-E6

A 250 ml 3NRB flask equipped with magnetic stirring, heating mantle, thermocouple, and inlet for nitrogen blanketing was charged with 10 grams styrene/vinylbenzyl chloride copolymer (St/VBC, composition 62-64 mol % styrene, 36-38 mol % VBC, $MW_n$ 55-60 kDaltons, and polydispersity 1.3), N-allylimidazole (in the range 0.84 to 1.00 mole equivalents relative to benzylchloride according to target ion exchange equivalent (IEC) value, with larger equivalent values generating higher IEC products), and 1-methoxy-2-propanol (26.8 grams). The mixture was stirred at 70° C. for 48 hours, resulting in a pale yellow solution.

Preparation of Polymers E7-10

A 250 ml 3NRB flask equipped with magnetic stirring, heating mantle, thermocouple, and inlet for nitrogen blanketing was charged with 10 grams styrene/vinylbenzyl chloride copolymer (St/VBC, composition 62-64 mol % styrene, 36-38 mol % VBC, $MW_n$ 55-60 kDaltons, and polydispersity 1.3), a mixture of tetramethylimidazole and N-allylimidazole (to a total of 0.85 mole equivalents relative to benzyl chloride, and with molar ratio of tetramethylimidazole to N-allylimidazole according to target composition), and 1-methoxy-2-propanol (26.8 grams). The mixture was stirred at 70° C. for 48 hours, resulting in a pale yellow solution.

Preparation of Polymers E11-15

A 250 ml 3NRB flask equipped with magnetic stirring, heating mantle, thermocouple, and inlet for nitrogen blanketing was charged with 10 grams styrene/vinylbenzyl chloride copolymer (St/VBC, composition 62-64 mol % styrene, 36-38 mol % VBC, $MW_n$ 55-60 kDaltons, and polydispersity 1.3), a mixture of 1,2-dimethylimidazole and N-allylimidazole (to a total of 0.85 mole equivalents relative to benzyl chloride, and with molar ratio of 1,2-dimethylimidazole to N-allylimidazole according to target composition), and 1-methoxy-2-propanol (26.8 grams). The mixture was stirred at 70° C. for 48 hours, resulting in a pale yellow solution.

Nuclear Magnetic Resonance (NMR) Spectroscopy Analysis of C1-C3 and E1-E15

An aliquot of a few drops of polymer solution was removed via glass pipette and transferred into a small glass vial, and the product was precipitated into ethyl acetate. The resulting white solid was washed with ethyl acetate (3×2 mL) and dried in a solvent oven (90° C., 3 hours). NMR samples were analyzed as solutions in $d_3$-acetonitrile or $d_7$-dimethylformamide unless otherwise stated.

NMR spectroscopy was conducted using a Bruker AVANCE III 500 MHz NMR spectrometer equipped with a CPBBO gradient cryoprobe, a Bruker B-ACS 60 autosampler, and Bruker Topspin 3.04 software. Quantitative proton NMR spectra were recorded with a 15° $^1H$ excitation pulse and acquisition time of 4 seconds. Two-dimensional (2D) $^1H$-$^{13}C$ NMR spectra were also collected to confirm the spectral assignments and were recorded in the HSQC (Heteronuclear Single Quantum Coherence) adiabatic material sweep width mode. Spectra were analyzed using Advanced Chemistry Development software (Toronto, Canada). Analysis of the integrals in the spectra gave measured composition vs. target composition for the St/VBC copolymers and for the ionomers (C1-C3 and E1-E15). For the ionomers (C1-C3 and E1-E15), analysis of integrals also generated mole % value of the conversion of chloromethyl groups to ionomeric (nitrogen cation) groups, and an ion exchange capacity (IEC) value (mmol nitrogen cation/g ionomer) (Table 2).

TABLE 2

Composition of cationic copolymers and membranes

| Polymer | Target composition (mol % base) | Mole equiv. total base | Conversion (%) | IEC (mmol/g) |
|---|---|---|---|---|
| C1 | 100% TMIM | 0.85 | 74 | 1.98 |
| C2 | 100% N-Propyl IM | 0.85 | 81 | 1.97 |
| C3 | 100% Me2N-Allyl | 0.85 | 85 | 2.07 |
| E1 | 100% Allyl IM | 0.84 | 73 | 2.03 |
| E2 | 100% Allyl IM | 0.90 | 79 | 2.07 |
| E3 | 100% Allyl IM | 0.92 | 91 | 2.10 |
| E4 | 100% Allyl IM | 0.93 | 90 | 2.08 |
| E5 | 100% Allyl IM | 0.94 | 90 | 2.14 |
| E6 | 100% Allyl IM | 1.00 | 90 | 2.21 |
| E7 | 75% Allyl IM 25% TMIM | 0.85 | 85 | 1.96 |
| E8 | 50% Allyl IM 50% TMIM | 0.85 | 83 | 1.95 |
| E9 | 25% Allyl IM 75% TMIM | 0.85 | 78 | 1.93 |
| E10 | 15% Allyl IM 85% TMIM | 0.85 | 81 | 1.89 |
| E11 | 10% Allyl IM 90% TMIM | 0.85 | 69 | 1.89 |
| E12 | 75% Allyl IM 25% DMIM | 0.85 | 81 | 1.96 |
| E13 | 50% Allyl IM 50% DMIM | 0.85 | 80 | 1.97 |
| E14 | 25% Allyl IM 75% DMIM | 0.85 | 83 | 1.98 |
| E15 | 10% Allyl IM 90% DMIM | 0.85 | 76 | 1.99 |

Membrane Preparation

Membranes were prepared by coating 30-33 weight percent solids copolymer solutions prepared as Examples and Comparative Examples on a release liner with a polyethylene terephthalate backing coated with an acrylic-based release layer as described in U.S. Pat. No. 7,816,477 (Suwa et al.). Membranes were coated using a BYK BYKO-drive automatic applicator (Gardco, Pompano Beach, FL) at a speed setting of 1 inch/sec (2.54 cm/sec) and with a notch bar applicator having a 10 mil (0.01 inches, 0.254 mm) gap, and then dried in a forced air oven at 80° C. for 30 minutes. Measured dry coating thicknesses were in the range of 45-52 micrometers.

Ultraviolet (UV) Crosslinking of Membranes

The solutions for UV cured membranes C4 and C5 were modified by addition of 1 wt % (based on polymer solids) TPO-L photo initiator, and the solution was stirred to dissolve the initiator. The membrane was then prepared as described above. After the drying step, the membrane was passed through a Light Hammer (LHC10 Mark 2) UV processor (Fusion UV Systems Inc., Gaithersburg, MD) using a "D-bulb" with three passes of the conveyor belt running at 50 feet per minute (0.254 m/s.) After cure, clear solid coatings were obtained. Successful crosslinking was demonstrated by a lack of solubility in methoxy-2-propanol, and by decreased dimensional swelling values relative to non-crosslinked membranes.

Tensile Properties of Membranes

The tensile stress-strain behavior of membranes was examined at a constant strain rate of 2 mm/second. Samples were soaked in aqueous 1M KOH solution for 24 hours at room temperature, thoroughly washed with deionized water, cut into 1.00 cm×4.00 cm strips, and tested in a fully hydrated state using a TA.XTPlus Texture Analyzer (Texture Technologies, Hamilton, MA). Dimensional swell values were obtained by measuring the x/y/z dimensions of the membranes before and after the aqueous KOH soak, and calculating percent changes.

TABLE 3

Tensile performance and swell in water for example membranes E1-E15 versus control membranes C1-C5.

| Membrane | Elongation (%) | Stress at break (MPa) | Modulus (MPa) | Dimensional Swell (x, y) | Dimensional Swell (z) |
|---|---|---|---|---|---|
| C1 | 55 | 2.6 | 19 | 34 | 29 |
| C2 | 86 | 3.1 | 20 | 38 | 39 |
| C3 | 42 | 2.1 | 20 | 30 | 88 |
| E1 | 57 | 6.9 | 64 | 20 | 22 |
| C4 (Crosslinked E1) | Too brittle to measure | | | 10 | 0 |
| E2 | 76 | 5.8 | 38 | 24 | 27 |
| E3 | 52 | 5.0 | 35 | 30 | 8 |
| E4 | 41 | 4.3 | 43 | 33 | 30 |
| E5 | 64 | 4.2 | 17 | 36 | 37 |
| E6 | 61 | 2.1 | 19 | 40 | 46 |
| E7 | 47 | 6.6 | 54 | 20 | 15 |
| E8 | 39 | 5.3 | 53 | 20 | 32 |
| E9 | 37 | 4.5 | 26 | 20 | 17 |
| E10 | 70 | 4.4 | 38 | 27 | 32 |
| E11 | 65 | 4.2 | 53 | 27 | 25 |
| C5 (Crosslinked E11) | 24 | 3.9 | 53 | 10 | 25 |
| E12 | 43 | 7.4 | 46 | 22 | 28 |
| E13 | 62 | 6.3 | 50 | 20 | 30 |
| E14 | 55 | 3.8 | 37 | 24 | 26 |
| E15 | 71 | 3.7 | 76 | 33 | 39 |

Conductivity of Membranes

Conductivity was measured using a 4-probe BekkTech BT-110 conductivity clamp (Scribner Associates, Inc., Southern Pines, NC) and a VMP3 Multi-channel potentiostat (Bio-Logic Science Instruments, Seyssinet-Pariset, France). A dry membrane sample in the chloride form (1.40 cm×4.00 cm) was assembled under two platinum wires, and the clamp was immersed into 18 MOhm deionized water for 2 hours before measurement to hydrate and swell the membrane. A current-voltage curve was recorded by applying a linear voltage sweep from an open circuit voltage (OCV) to 0.3 V first, and then to −0.3 V, and back to OCV at 10 mV/s scan rate. Conductivity was calculated from the slope of the resulting current-voltage curve using the measured dry membrane size and thickness, and a conductivity clamp constant of 0.425 cm.

TABLE 4

Conductivity in water for membranes

| Membrane | Conductivity in Cl⁻ form (mS/cm) |
|---|---|
| C1 | 20.3 |
| E1 | 17.1 |
| E3 | 19.3 |
| E5 | 19.2 |
| E7 | 16.6 |
| E8 | 17.9 |
| E9 | 17.9 |

$CO_2$ Electrolyzer Performance Measurement

A $CO_2$ electrolyzer cell (fuel cell hardware from Fuel Cell Technologies Inc., Albuquerque, NM, modified such that the graphite flow field on the anode side was removed and replaced with a titanium flow field) was assembled by placing the membrane of interest sandwiched between two spray-deposited electrodes: Ag electrode (cathode from Dioxide Materials, Inc.) on SGL 39BC carbon paper (5 cm² geometric area), and $IrO_2$ electrode (anode from Dioxide Materials, Inc.) on Toray 120-H, 5% PTFE carbon paper (7 cm² geometric area). Glass filled PTFE gaskets were used to achieve 20% compression based on electrodes thickness. The assembly was tightened in a star pattern by applying 50 in-lbs torque. Humidified room temperature $CO_2$ was fed into the cathode at 25 sccm, and 120 ml of 10 mM aqueous $KHCO_3$ solution was recirculated on the anode side at 6.0 ml/min.

Before assembly, the Ag electrode and membrane were activated by soaking in an aqueous 1N KOH solution at room temperature for 24 hours to exchange the anions in the as-synthesized polymer with OH⁻ anions. Activated Ag electrode and membrane were removed from the solution and assembled while wet (without rinsing) in the cell for electrochemical testing.

The device as assembled was connected to a BCS-815 Battery Cycling System (Bio-Logic Science Instruments, Seyssinet-Pariset, France). The cell potential was scanned to the desired voltage (3.0 V) at a 50 mV/s scan rate and the cell was switched to 3.0 V fixed cell voltage mode and run at RT until reaching 100 hours test time. The output gas stream from the cathode flow field was fed into an Agilent 7890B gas chromatograph (Agilent Technologies, Santa Clara, CA) for analysis of its chemical components.

TABLE 5

Performance in $CO_2$ electrolyzer for membranes

| Membrane | Current density at 3.0 V (mA/cm²) | $CO/H_2$ product selectivity (%) |
|---|---|---|
| C1 | 160 | 99.6 |
| E1 | 90 | 99.2 |
| E3 | 105 | 99.2 |
| E8 | 110 | 99.1 |

What is claimed is:

1. A cationic copolymer comprising:
   a) a first monomeric unit of Formula (I) having a pendant N-allylimidazolium-containing group in an ortho, para, or meta position of a benzene ring; and

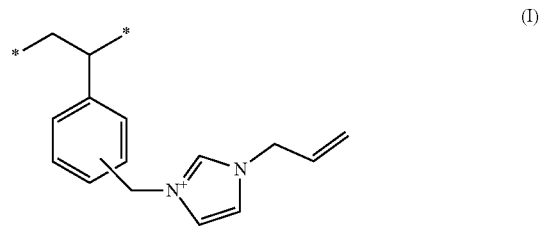

(I)

b) second monomeric units of Formula (II-1), Formula (II-2) or a mixture thereof; and

(II-1)

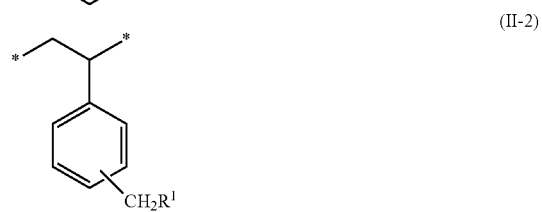

(II-2)

c) an optional third monomeric unit of Formula (III);

(III)

wherein
   $R^1$ is halo, hydroxy, or alkoxy and the pendant group —$CH_2R^1$ is in an ortho, para, or meta position;
   group $R^2$ is a cationic, nitrogen-containing group and group —$CH_2R^2$ is in an ortho, para, or meta position;
   any cationic group in the copolymer has a corresponding anionic group;

each asterisk (*) is a point of attachment to another group or monomeric unit in the copolymer;

Formula (III) is different from Formula (I); and the cationic copolymer is not crosslinked and comprises
- 20 to 50 mole percent monomeric units having a cationic, nitrogen-containing group comprising the first monomeric units of Formula (I) or a mixture of the first monomeric units of Formula (I) and the third monomeric units of Formula (III) based on total moles of monomeric units in the cationic copolymer;
- 50 to 80 mole percent second monomeric units of Formula (II-1) based on total moles of monomeric units in the cationic copolymer; and
- 0 to 20 mole percent second monomeric units of Formula (II-2) based on total moles of monomeric units in the cationic copolymer.

2. The cationic copolymer of claim 1, wherein $R^2$ of the third monomeric units is a cationic, nitrogen-containing heterocyclic group optionally substituted with one or more alkyl groups.

3. The cationic copolymer of claim 2, wherein the cationic, nitrogen-containing heterocyclic group is imidazolium substituted with one or more alkyl groups, pyridinium, or pyridinium substituted with one or more alkyl groups.

4. The cationic copolymer of claim 1, wherein the third monomeric unit of Formula (III) is of Formula (IV)

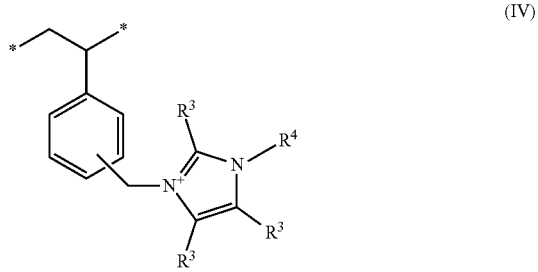

(IV)

wherein
$R^3$ is hydrogen or alkyl; and
$R^4$ is alkyl.

5. The cationic copolymer of claim 1, wherein the third monomer of Formula (III) is of Formula (V)

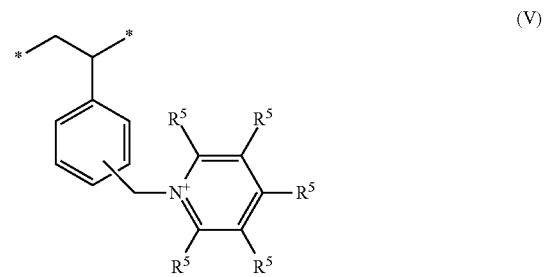

(V)

wherein $R^5$ is hydrogen or alkyl.

6. The cationic copolymer of claim 1, wherein $R^2$ is of formula $-(NR^6R^7R^8)^+$ wherein $R^6$, $R^7$, and $R^8$ are each independently an alkyl.

7. The cationic copolymer of claim 1, wherein $R^2$ is a guanidinium group that is substituted with multiple alkyl groups.

8. The cationic copolymer of claim 1, wherein the monomeric units having a cationic, nitrogen-containing groups are 5 to 100 mole percent first monomeric units of Formula (I) and 0 to 95 mole percent third monomeric units of Formula (III).

9. The cationic copolymer of claim 8, wherein the monomeric units having a cationic, nitrogen-containing group are 10 to 100 mole percent first monomeric units of Formula (I) and 0 to 90 mole percent third monomeric units of Formula (III).

10. An anion exchange membrane formed by casting the cationic copolymer of claim 1 from a solvent.

11. An electrochemical cell comprising an anode, a cathode, and an anion exchange membrane positioned between the anode and the cathode, wherein the anion exchange membrane is formed by casting the cationic copolymer of claim 1 from a solvent.

* * * * *